(12) United States Patent
Fortain et al.

(10) Patent No.: US 6,392,194 B1
(45) Date of Patent: May 21, 2002

(54) PROCESS FOR THE MIG WELDING OF ALUMINIUM AND ITS ALLOYS IN PULSED MODE OR UNMODULATED-SPRAY MODE

(75) Inventors: Jean-Marie Fortain, Osny; Philippe Lefebvre, Saint Ouen l'Aumone; Gerard Plottier, Pierrefitte, all of (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/550,792

(22) Filed: Apr. 17, 2000

(30) Foreign Application Priority Data

Apr. 15, 1999 (FR) .............................................. 99 04728

(51) Int. Cl.$^7$ .............................................. B23K 9/173
(52) U.S. Cl. .................................... 219/137 PS; 219/74
(58) Field of Search .................... 219/74, 127, 137 PS, 219/137 R, 75

(56) References Cited

U.S. PATENT DOCUMENTS

| | | | | |
|---|---|---|---|---|
| 2,984,734 A | * | 5/1961 | Brittaine et al. | ............. 219/127 |
| 3,002,085 A | * | 9/1961 | Lobosco et al. | ............... 219/74 |
| 3,143,631 A | * | 8/1964 | Sohn et al. | ..................... 219/74 |
| 4,071,732 A | | 1/1978 | Tanaka et al. | |
| 4,912,299 A | * | 3/1990 | Oros et al. | ...................... 219/74 |
| 6,111,218 A | * | 8/2000 | Matile et al. | ........... 219/137 PS |

FOREIGN PATENT DOCUMENTS

EP                0 442 475           8/1991

* cited by examiner

*Primary Examiner*—Clifford C. Shaw
(74) *Attorney, Agent, or Firm*—Young & Thompson

(57) ABSTRACT

The process includes shielding of at least part of the welding zone with a gas mixture consisting of 1.2 to 1.70% oxygen and the balance being argon.

9 Claims, 4 Drawing Sheets

PROCESS FOR THE MIG WELDING OF ALUMINIUM AND ITS ALLOYS IN PULSED MODE OR UNMODULATED-SPRAY MODE

The present invention relates to a MIG (Metal Inert Gas) process for the electric-arc welding of aluminium and aluminium alloys in pulsed mode or in spray mode, with the exception of a process in spray mode with modulated current.

BACKGROUND OF THE INVENTION

The electric-arc welding process using a meltable wire as electrode and an inert gas for shielding the welded zone is well known and widely used in industry. Usually, it is called the MIG welding process.

When the meltable wire, that is to say the electrode, melts, the molten metal can be transferred according to several modes. Thus, mention may be made of the modes:

called "short-circuiting" mode, in which a drop of molten metal forms, at a low arc energy, at the end of the meltable wire, then grows and thereafter comes into contact with the weld puddle before detaching from the wire;

called "spray" mode, in which the transfer of metal from the wire to the puddle of molten metal takes place, at high energy and high current density, and at a high speed, in the form of fine droplets having a diameter of less than that of the wire and along the axis of the said wire. It is characterized by a very stable arc and no spatter of metal;

called "pulsed" mode, in which current pulses are superimposed on a base current intended to maintain the arc, so as to send one drop of molten metal per current pulse. This mode is comparable to the spray mode (with axial spraying), but with the use of a lower mean current.

In order to follow the technological developments in industry, such as those of the transportation (railway, naval, automobile, aeronautic or space) sector or the energy and storage sector, the MIG process has had to be adapted.

First of all, there has been significant development in current sources (power electronics with microprocessor control) and this has been followed by a more rational choice of welding gases, which has allowed the expectations of industry to be more specifically met, particularly in terms of welding productivity and quality.

Thus, it has been shown that argon leads, both in automatic and manual welding, to good transfer of metal into the arc and a beautiful shiny appearance of the welds thus produced.

On the other hand, argon does not allow high welding rates and can give rise, in automatic welding, to arc instabilities above 500 A.

In addition, the narrow characteristic shape of the penetrations obtained under argon do not fit well with welding by interpenetration.

In mixtures of argon and helium (hereafter called Ar/He mixtures), the helium makes it possible to increase the depth of penetration and its root width, and therefore is able to allow expensive preparations to be dispensed with, this being all the more pronounced the higher the helium content.

In other words, for a constant thickness, it therefore allows higher welding rates the higher its content.

In general, the compactness of the beads is also improved, but to the detriment of the appearance of the beads, which are less shiny than under pure argon.

The Ar/He mixtures are therefore of obvious advantage in terms of quality and productivity both in manual welding (Ar+20% He) and in automatic welding (Ar+50% to 70% He), but faced, however, with a not insignificant cost owing to the helium content.

For applications not necessarily requiring these two criteria to be met, it may be judicious to consider other types of mixtures.

Thus, document EP-A-639,423 proposes, for TIG and MIG processes, the use of a welding gas of the argon or argon/helium type containing, in addition, from 100 to 1000 ppmv of $CO_2$ and/or $O_2$.

Furthermore, document DE-A-4,241,982 proposes the use of argon or an argon/helium mixture to which, moreover, from 80 to 250 ppmv of nitrogen has been added.

However, none of these known processes is entirely satisfactory from the industrial standpoint.

What is more, in modulated spray MIG welding, that is to say with the welding current being modulated, it has already been recommended to use a shielding gas or gas mixture, formed from argon, helium or their mixtures, to which from 0.01% to 1.80% of carbon dioxide and/or oxygen has been added, as described in EP-A-909,604.

However, in this case, current modulations at a frequency of less than 60 Hz are applied to the current so as to be able to outgas the weld puddle in order to remove gaseous inclusions therefrom, particularly diffusible hydrogen, which are liable to be found therein.

Thus, MIG processes in spray mode with current modulations are employed when it is desired to obtain a high quality of the welded joint, but without the real need to achieve a high welding speed.

Consequently, the problem that arises is to improve the known MIG welding processes that do not involve modulating the welding current, particularly MIG processes in unmodulated spray mode, that is to say without modulating the welding current, as well as those in pulsed mode, in order to obtain high performance in terms of welding productivity and speed.

To do this, MIG processes in unmodulated spray mode and those in pulsed mode are much more suitable when it is desired to improve the productivity rather than the quality, that is to say the appearance, of the welds thus produced.

However, hitherto MIG processes in unmodulated mode or in pulsed mode have been used little, or not at all, for welding aluminium or its alloys when the gas shield contains oxygen.

This is because it is commonly recognized that the presence of oxygen in the gas shield may have a deleterious impact on the weld given that, when oxygen is incorporated into the gas shield, it can easily combine with aluminium atoms and result in solid inclusions of alumina ($Al_2O_3$) in the weld, these having a negative impact on the mechanical properties of the said weld. This has, moreover, been confirmed in the case of high oxygen contents, that is to say oxygen contents greater than 2%, as well as in the case of high carbon dioxide contents, that is to say, again, contents greater than 2%.

However, conversely, the presence of oxygen in the stream of shielding gas results in acceptable productivity levels.

It therefore follows that the problem which arises is to provide an MIG welding process for aluminium and its alloys which makes it possible to achieve both a high and industrially acceptable productivity and a low concentration of alumina inclusions in the weld without a major or appreciable impact on the mechanical properties of the welded

SUMMARY OF THE INVENTION

The solution provided by the present invention therefore relies on a process for the MIG welding of aluminium and aluminium alloys in spray mode without current modulation or in pulsed mode, with the use of gas shielding of at least part of the welding zone, characterized in that the gas shield is a gas mixture consisting of 0.01% to 1.80% oxygen and of 98.20% to 99.99% argon.

Further features of the process of the invention are given below:

- the shielding gas mixture contains from 0.5 to 1.8% oxygen, the balance being argon;
- the gas mixture or shield contains from 1 to 1.7% oxygen, the balance being argon;
- the gas mixture or shield contains from 1.2 to 1.65% oxygen, the balance being argon;
- a solid meltable wire or a flux-cored wire is used;
- the welding speed is from 0.25 m/minute to 1.20 m/minute, preferably from 0.60 to 1 m/minute;
- the wire feed rate is from 2.5 m/minute to 20 m/minute, preferably from 4 m/minute to 13 m/minute;
- the mean welding current is from 40 A to 450 A and/or the mean welding voltage is from 15 V to 40 V;
- the process is in pulsed mode and/or the welding current is from 120 A to 350 A and/or the mean welding voltage is from 20 V to 28 V;
- the process is in spray mode and/or the welding current is from 180 A to 450 A and/or the mean welding voltage is from 20 V to 39 V.

The present invention therefore relies on precise control of the oxygen content in the argon, the oxygen content having not to exceed approximately 1.80% at most; the gas mixture thus formed constitutes the gas shield used during the use of the MIG process.

It should be emphasized that any MIG process in spray mode with modulation of the welding current is excluded from the invention.

BRIEF DESCRIPTION OF THE DRAWINGS

The invention will now be more clearly understood by virtue of the examples below, given by way of illustration that implies no limitation, the results of which are shown schematically in the figures appended hereto.

DETAILED DESCRIPTION OF THE INVENTION

EXAMPLES

Figure 1:
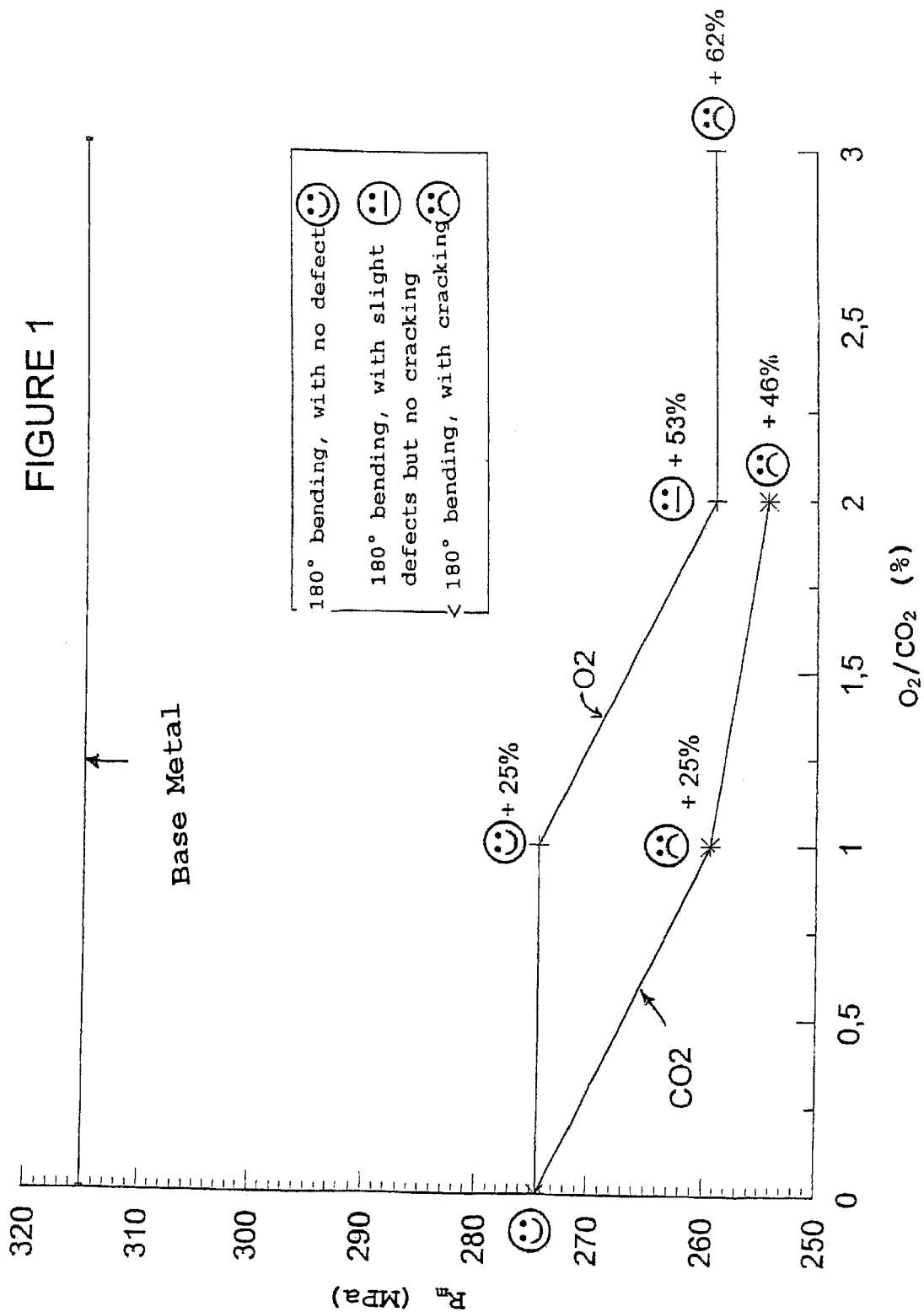
FIG. 1 (5000 arloy grade) and FIG. 3 (6000 alloy grade) show the influence of adding increasing amounts of $O_2$ or $CO_2$ to the argon in MIG welding in unmodulated spray mode on the bending resistance behaviour and the tensile strength on tensile test pieces, whereas FIG. 2 (5000 alloy grade) and FIG. 4 (6000 alloy grade) show the influence of adding increasing amounts of $O_2$ or $CO_2$ to the argon in MIG welding in pulsed mode on the bending resistance behaviour and the tensile strength on tensile test pieces.
Figure 2:
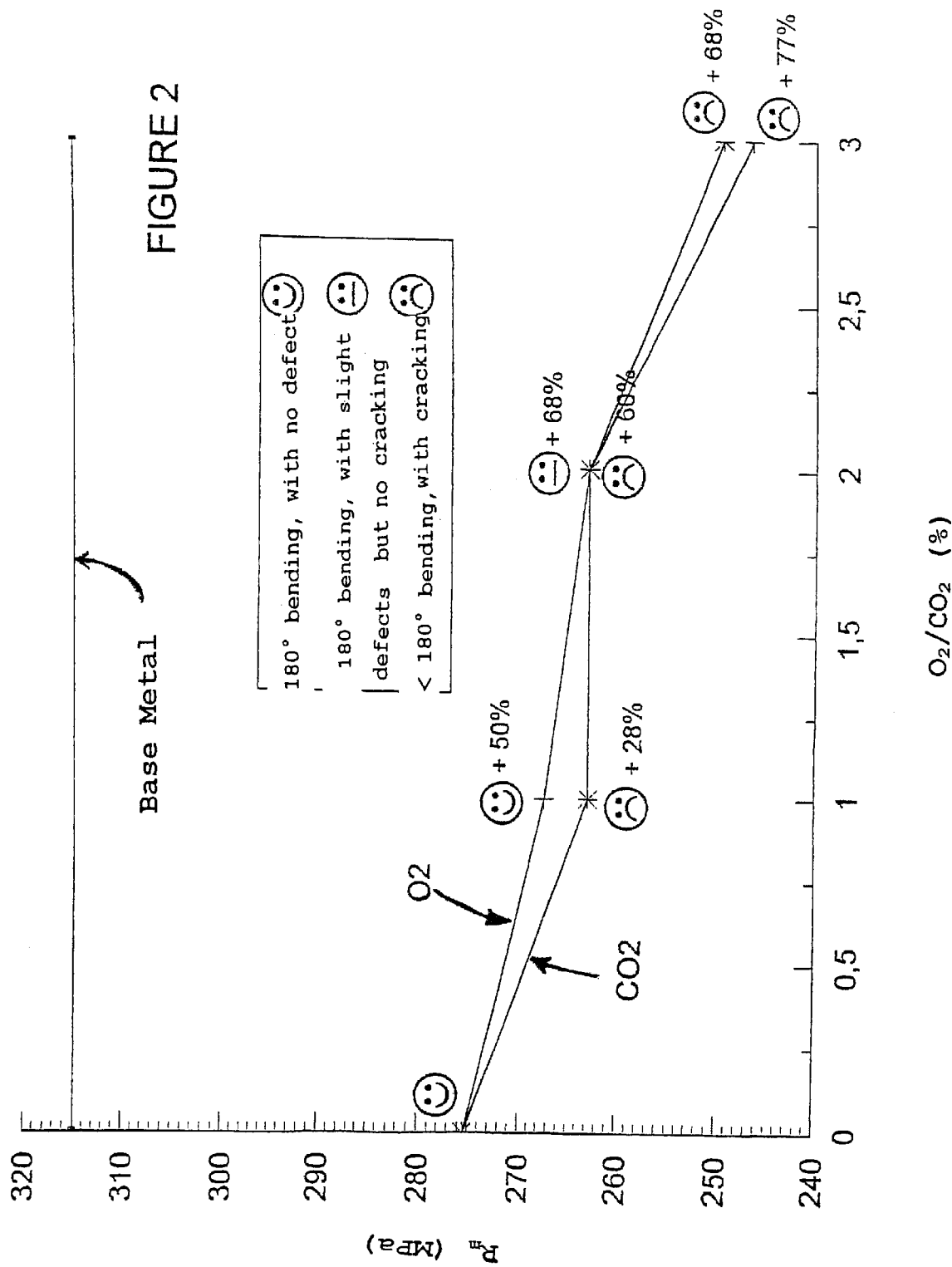

In order to show the effectiveness of the MIG process according to the invention, several comparative trials were carried out.

Within the context of these trials, aluminium workpieces (aluminium grades 5000 and 6000 according to the NFEN 485, 487, 515 and 573 standards) were welded according to a MIG process in unmodulated spray mode and in pulsed mode, using a gas shield consisting of argon to which from 1 to 3% $O_2$ or, depending on the case, from 1 to 3% $CO_2$ was added.

The current generator is a 480 TRS generator sold by La Soudure Autogene Francaise.

The meltable wire, as filler metal used, is in all cases a wire 1.2 mm in diameter of the 5356 type (according to the AWS A5.10 and NF A50.403 standards).

Prior to welding, the aluminium workpieces are prepared by mechanical gouging.

The other welding parameters are given in Table I below, in which:

$V_{wire}$ represents the feed rate of the meltable wire;

$I_{peak}$ represents the peak current;

$I_{base}$ represents the base current;

$I_{mean}$ represents the mean current;

$U_{peak}$ represents the peak voltage;

$U_{mean}$ represents the mean voltage;

$f_p$ represents the current pulse frequency (in pulsed-mode MIG);

$t_p$ represents the current pulse time (in pulsed-mode MIG).

TABLE I

| | Welding parameters | | | |
|---|---|---|---|---|
| Mode | Spray | Pulsed | Spray | Pulsed |
| Grade of the aluminium workpiece | 5000 | 5000 | 6000 | 6000 |
| Thickness (mm) | 6 | 6 | 6 | 6 |
| $V_{wire}$ (m/min.) | 12.5 | 9 | 12.5 | 10.1 |
| $I_{peak}$ (A) | — | 330 | — | 330 |
| $I_{base}$ (A) | — | 110 | — | 110 |
| $I_{mean}$ (A) | 210–230 | 156–180 | 210–230 | 156–180 |
| $U_{peak}$ (V) | — | 28 | — | 29 |
| $U_{mean}$ (V) | 22–25 | 20–25 | 22–25 | 20–25 |
| $f_p$ (Hz) | — | 155 | — | 155 |
| $t_p$ (ms) | — | 1.6 | — | 1.6 |

The results obtained are given below, after assessing the performance in terms of productivity (welding speed) and of joint quality (compactness and appearance of the bead) and the mechanical properties.

In Tables II and III, the speed increases given for the 3 grades of aluminium were determined with respect to the welding speeds conventionally obtained with argon (without the addition of $O_2$ or $CO_2$).

The shaded areas correspond to additions to be proscribed, for which the mechanical properties of the joints (tensile and/or flexural strength) are unsatisfactory.

TABLE II

| | Argon + $O_2$ | | | |
|---|---|---|---|---|
| Mode | Spray | Pulsed | Spray | Pulsed |
| Grade | 5000 | 5000 | 6000 | 6000 |
| + 1% $O_2$ | + 25% | + 50% | + 15% | + 10% |
| + 2% $O_2$ | + 53% | + 68% | + 45% | + 32% |
| + 3% $O_2$ | +62% | +68% | ND | ND |

ND: not done because of the results obtained on the 5000 grade.

TABLE III

Argon + CO$_2$

| Mode | Spray | Pulsed | Spray | Pulsed |
|---|---|---|---|---|
| Grade | 5000 | 5000 | 6000 | 6000 |
| + 1% CO$_2$ | + 25% | + 28% | ND | ND |
| + 2% CO$_2$ | + 46% | + 60% | ND | ND |
| + 3% CO$_2$ | - | + 77% | ND | ND |

ND: not done because of the results obtained on the 5000 grade.

It is clearly apparent from Tables II and III that although the additions of CO$_2$ give a priori higher performance in terms of welding speed, only the additions of O$_2$ not exceeding 2% make it possible to guarantee the mechanical properties of the various grades of the aluminium workpieces.

Moreover, in order to evaluate the performance in terms of joint quality (compactness and appearance of the bead), radiographic examinations were made on the workpieces of 5000 grade, these giving no indications different from those usually found in MIG welding with argon or Ar/He mixtures. Nevertheless, for additions of CO$_2$ of 3% and more, the highly contorted surface appearance is likely to conceal any fine defects, in radiography.

Therefore, as a complement, macrographic samples made it possible to reveal, by simple polishing, areas of small inclusions (about 0.01 mm in size), of different distribution and orientations. However, for the same % of addition, these areas are much greater in size and in density with CO$_2$ than with O$_2$.

These areas were identified in the SEM as areas of alumina (Al$_2$O$_3$). Furthermore, the appearance of the beads obtained with the Ar/O$_2$ and Ar/CO$_2$ mixtures differs substantially from those produced with pure argon. This is because, for both types of additions, CO$_2$ or O$_2$, the beads are dull, or even blackish, in appearance depending on the content used. Generally, the surface deposits obtained with the addition of CO$_2$ are more pronounced and more adherent than those produced with O$_2$, which can be removed simply by brushing or with the aid of a cloth.

Next, the mechanical properties were measured using skived crosswise tensile test pieces and crosswise bending specimens taken from joints.

Tables IV and V below give the tensile results, which are expressed in terms of a joint coefficient (strength of the melted metal/strength of the base metal).

It should be noted that the differences in joint coefficients between the 5000 and 6000 grades are simply due to the use of a 6000 grade base metal delivered in the T6 state, while the joint underwent no postwelding heat treatment.

TABLE IV

Ar + O$_2$

| Mode | Spray | Pulsed | Spray | Pulsed |
|---|---|---|---|---|
| Grade | 5000 | 5000 | 6000 | 6000 |
| + 1% O$_2$ | 0.87 | 0.85 | 0.70 | 0.66 |
| + 2% O$_2$ | 0.82 | 0.83 | 0.70 | 0.65 |
| + 3% O$_2$ | 0.82 | 0.77 | ND | ND |

ND: not done because of the results obtained on the 5000 grade.

TABLE V

Ar + CO$_2$

| Mode | Spray | Pulsed | Spray | Pulsed |
|---|---|---|---|---|
| Grade | 5000 | 5000 | 6000 | 6000 |
| +1% CO$_2$ | 0.82 | 0.83 | ND | ND |
| +2% CO$_2$ | 0.80 | 0.83 | ND | ND |
| +3% CO$_2$ | — | 0.79 | ND | ND |

ND: not done because of the results obtained on the 5000 grade.

The results obtained reveal, on the fracture surfaces of these test pieces, areas of fine dispersed black inclusions. These observations confirm the results of the macrographic examinations. As the percentage of O$_2$ or CO$_2$ is increased, these inclusions become greater in size and in density, and cause a greater reduction in deformability in the bending tests, as well as a substantial reduction in mechanical properties.

The results of the latter are rated as being acceptable (180° bending angle without any defect or with only slight defects) and as unacceptable (bending angle <180° with cracking).

However, it should be emphasized that the areas of inclusion (alumina) are much denser and more numerous with Ar+CO$_2$ mixtures than with Ar+O$_2$ mixtures.

The results are shown diagrammatically in the appended FIGS. 1 to 4.

Figure 3:
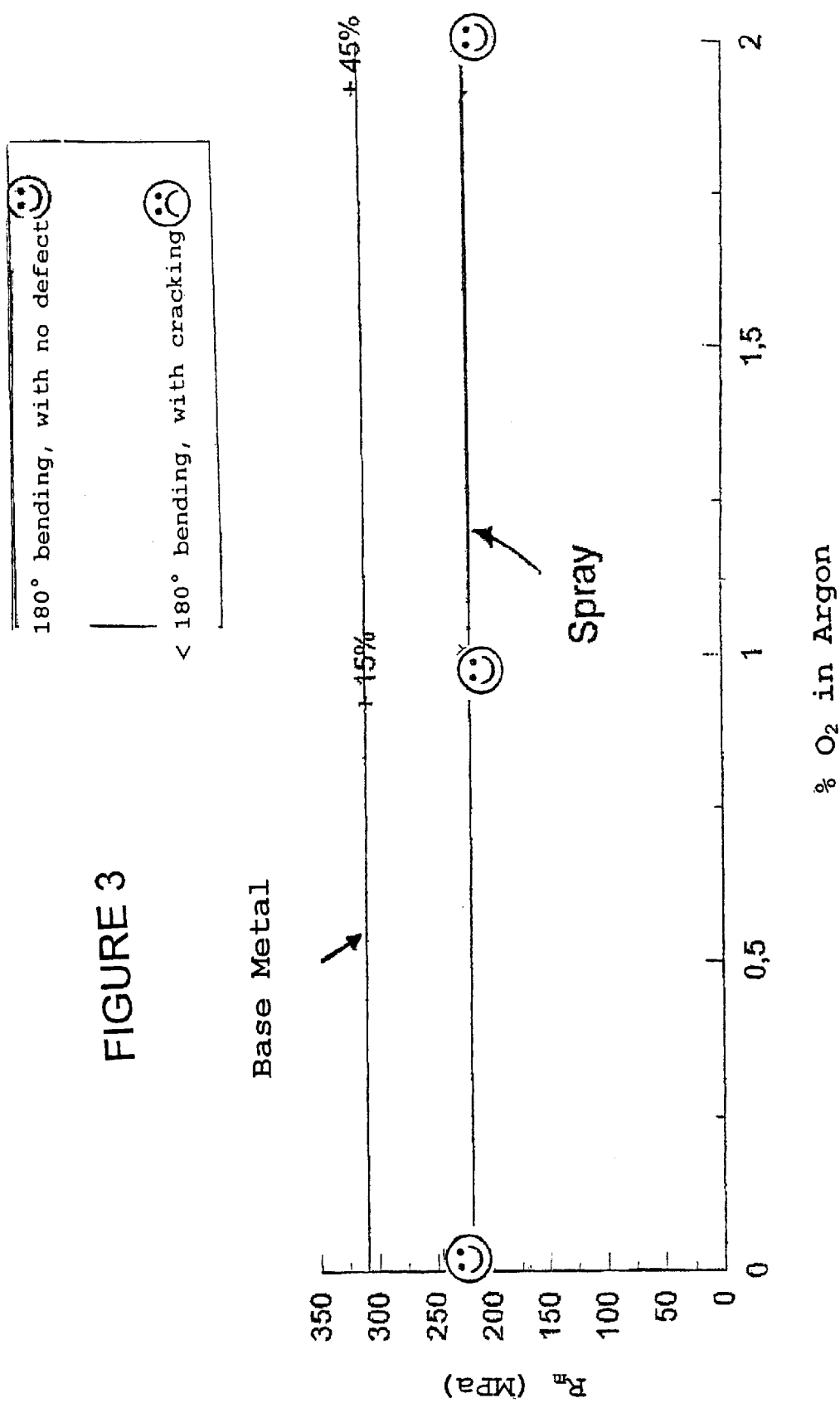
Figure 4:
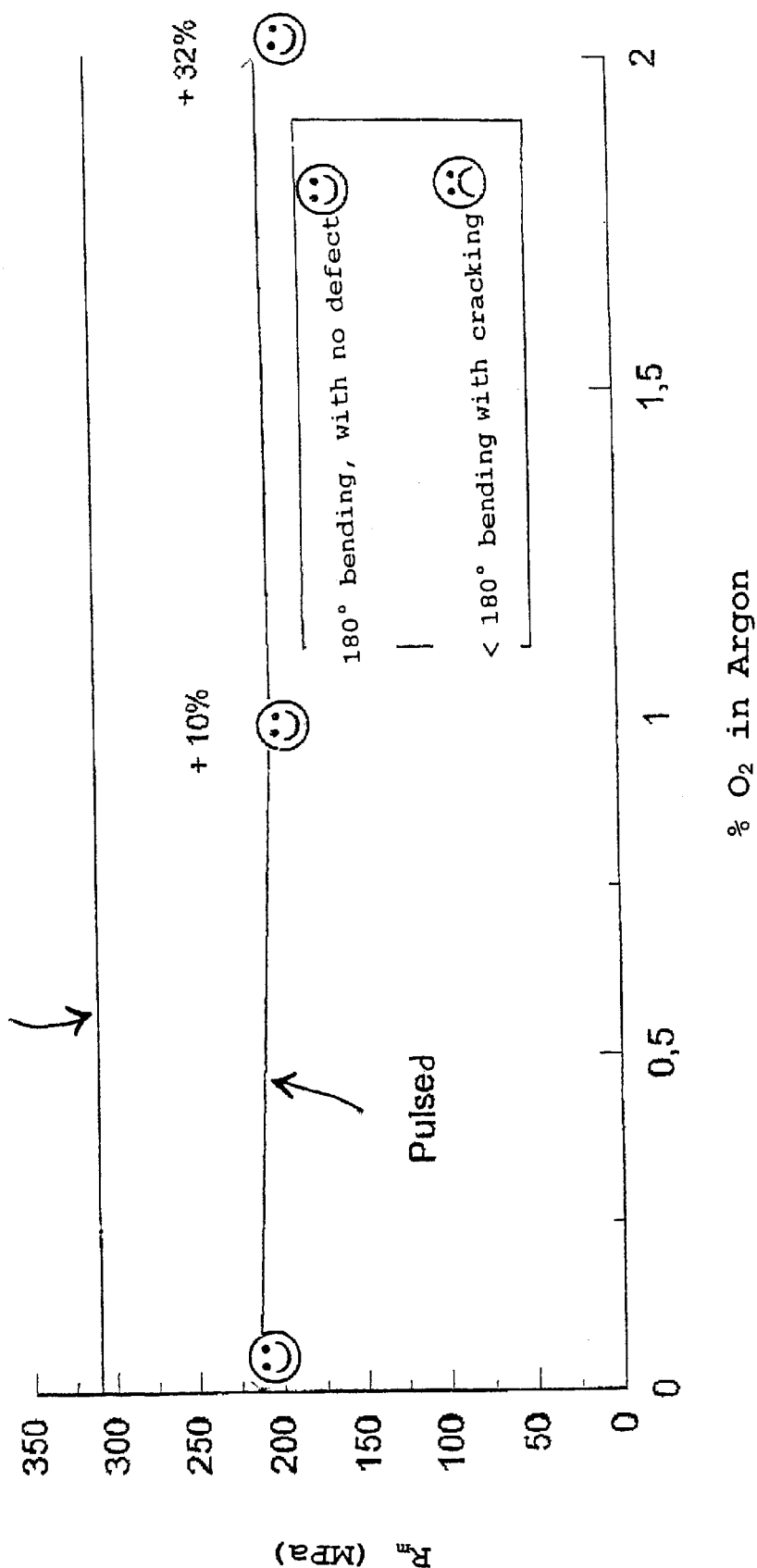

In FIGS. 1 to 4, the x-axis represents the contents (in %) of O$_2$ or CO$_2$ in the argon and the y-axis represents the values (in MPa) of the tensile strength (R$_m$) of the 5000 grade joints (FIGS. 1 and 2) and 6000 grade joints (FIGS. 3 and 4).

The results are regarded as being acceptable when the 180° bending produces "no defect" or "slight defects, but without cracking" (see the legend in FIGS. 1 to 4).

FIGS. 3 and 4 show that there is no degradation in the mechanical properties of the melted zone as a function of the O$_2$ content in so far as the tensile test pieces systematically break in the connection zone corresponding to a T4 state of the material, inferior to the unaffected delivery state T6.

This also explains the differences in the joint efficient between the 5000 and 6000 series.

Finally, the best results are obtained by using argon/oxygen mixtures containing less than 2% oxygen.

Further trials have shown that the best results are obtained for oxygen contents of 1.20% to 1.70%, preferably about 1.50%.

What is claimed is:

1. In a pulsed mode process for MIG welding of aluminum and aluminum alloys, which comprises passing a current through a meltable electrode to melt the electrode and form a welding zone, the improvement comprising the step of shielding at least part of the welding zone with a gas mixture consisting of 1.2 to 1.70% oxygen and the balance being argon.

2. The process according to claim 1, wherein the electrode comprises a solid meltable wire or a flux-cored wire.

3. The process according to claim 1, wherein the welding speed is from 0.25 m/minute to 1.20 m/minute.

4. The process according to claim 1, wherein the welding speed is from 0.60 to 1 m/minute.

5. The process according to claim 1, wherein the electrode feed rate is from 2.5 m/minute to 20 m/minute.

6. The process according to claim 1, wherein the electrode feed rate is from 4 m/minute to 13 m/minute.

7. The process according to claim 1, wherein the mean welding current is from 40 A to 450 A.

8. The process according to claim 1, wherein the mean welding voltage is from 15 V to 40 V.

9. The process according to claim 1, wherein the welding current is from 120 A to 350 A and the mean welding voltage is from 20 V to 28 V.

* * * * *